Aug. 25, 1964           A. BEBER              3,145,711
                   DISPOSABLE NASAL FILTER
                    Filed Dec. 8, 1961
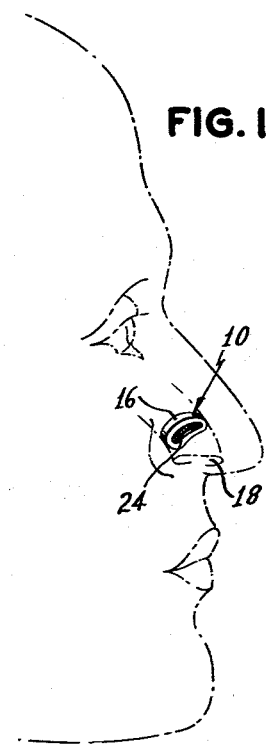
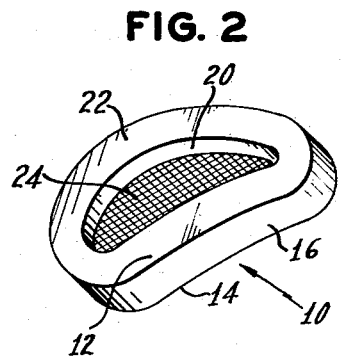
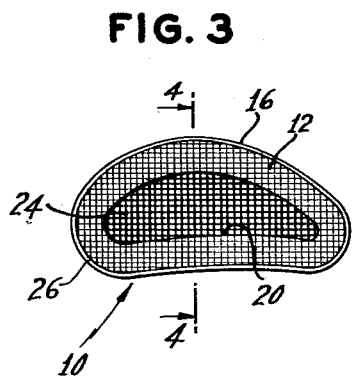
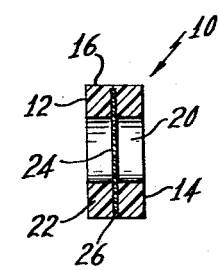
INVENTOR.
ARTHUR BEBER
BY Jerome Bauer
ATTORNEY

3,145,711
DISPOSABLE NASAL FILTER
Arthur Beber, 127 15th St., Garden City, N.Y.
Filed Dec. 8, 1961, Ser. No. 158,025
1 Claim. (Cl. 128—148)

This invention relates to disposable nasal filters.

The desideratum of this invention is to provide a nasal filter that may be inserted easily into the nasal passage to conform thereto and adhere with a very slight frictional engagement to the walls of the mucous membrane of the passage to prevent its accidental displacement therefrom and to provide the nasal passage with a means for filtering dust, pollen and other impurities or particles found in smoke, smog and paint spray.

Another object of the invention is to provide a nasal filter that is so simple in construction containing no refillable parts and so inexpensive to manufacture that it may be thrown away after a reasonable period of use.

Still another object of the invention is to provide a disposable nasal filter composed of non-toxic, non-irritating parts all molded into a unitary construction that may be applied or inserted into the nasal passage in contact with the mucous membranes thereof without fear of damage or harm thereto.

Other and further objects of this invention reside in the structures and arrangements hereinafter more fully described with reference to the accompanying drawing in which:

FIG. 1 is a view of the nasal filter constructed according to the teaching of the invention and as applied to a nasal passage, FIG. 2 is a perspective view of the nasal filter, FIG. 3 is a plan view of the nasal filter, and FIG. 4 is a cross-section of FIG. 3 taken along lines 4—4.

Referring now to the figures of the drawing, the nasal filter there shown is generally identified by the numeral 10 and comprises a body that may be said to have two oppositely disposed sides 12 and 14. In actual construction, the sides 12 and 14 are unitarily formed with each other so that there is no line of demarcation between them. However, for the purpose of providing a clear insight into the invention, the body may be said to have the two sides 12 and 14. The outer peripheral wall 16 bordering the sides 12 and 14 is smooth and uninterrupted in construction. In plan view, the wall 16 is shaped to conform substantially to the horizontal cross-sectional configuration of the nasal passage 18 into which the same is adapted to be inserted.

For purposes of illustration, FIG. 1 depicts a human head wherein the nasal passage 18 is clearly illustrated. The body of the nasal filter 10 has an air passageway 20 defined therein that extends completely therethrough from one side 12 to the other side 14 thereof. The defining wall of the air passageway 20 is similar in shape to the outer peripheral wall 16 and, therefore, the body is formed as the rim 22 that is shaped substantially to the contour of the nasal passage 18.

Interposed in and full covering relationship with the air passageway 20 is a porous filter means 24. The porous filter means 24 may be of any well known construction. It has been found that a simple mesh gauze having a plurality of closely packed or spaced interwoven lines of flexible, pliable fabric strands of material forming a plurality of pores or filter openings between them, is highly satisfactory for the purpose of the instant invention. However, it has been found that other porous filter means may be utilized. Therefore, the scope of the invention is not to be deemed to be limited to the use of a gauze since other porous filtering means may be employed. The filter means 24 is molded as an integral part of the rim-shaped body 22 and, therefore, fully covers the air passageway 20.

The rim-shaped body 22 is molded of a flexible, pliable, inert, non-toxic, glycerin gelatin material. During the molding process, the two mold members (not shown), each having a cavity coinciding with the contour of a respective one of the sides 12 and 14 respectively, are placed in adjacent facing relationship. The filter means 24 is positioned initially between the cavities of the mold members. The glycerin gelatin molding material is then poured into the mold between the mold members and flows into the cavities of the mold members and through the pores of the filter means 24. When the glycerin gelatin molding material cools and congeals, it is of unitary construction and looks like the nasal filter 10 illustrated in the figures of the drawing. Because the molding material penetrates the pores of the filter means 24 about the confines of the air passageway 20 during the molding operation, the resultant nasal filter 10 is of unitary, undivided construction wherein, the sides 12 and 14 are unitarily joined together to form the rim-shaped body 22. Further, because the filter means 24 is slightly smaller in size than the rim-shaped body 22, the sides 12 and 14 flow from their opposite sides over and completely about the peripheral edge thereof to fully encompass the same as indicated at 26 in FIGS. 3 and 4. The filter means 24 is also unitarily joined to the rim 22 since the molding material penetrates through and congeals about the material defining the pores of the filter means while joining the sides 12 and 14 together.

The glycerin gelatin molding material is flexible and pliable. Hence, it bends easily and conforms gently and snugly to the contour of the nasal passage 18 as it is inserted into the same (FIG. 1) by light finger pressure. The molding material has a long history of established inertness and is non-irritating and non-toxic and, therefore, will not damage or harm the mucous membranes of the nasal passage 18. In fact, it has been found that when the outer peripheral wall 16 of the nasal filter comes into touching engagement with the normally moist mucous membranes of the nasal passage 18, it exhibits a tackiness that causes it to adhere to the wall of the nasal passage 18, preventing its possible accidental displacement during sleeping hours or vigorous movements of the user.

Thus, under normal conditions, the co-efficient of friction of the material by which the body rim 22 and its outer peripheral wall 16 are formed is less than that when the same is wetted by its touching engagement with the moist mucous membranes of the nasal passage 18. The filter means 24, being of a pliable porous material, enable the body rim 22 to move unrestricted so that the same may assume any configuration that is necessary to permit it to conform to the shape and contour of the nasal passage 18 into which it is adapted to be inserted.

The glycerin gelatin molding material may be tinted by the addition of certified food dyes or colors to bring out a desired flesh color. Hence, when inserted into the nasal passage 18, its presence will not be readily obvious to others. Quite obviously, air traversing the through air passageway 20 of the nasal filter 10 must pass through the interposed filter means 24 to be properly filtered thereby. Recognizably, the filter means 24 may be coated with medicaments to provide the user with a long and continuous application of filtered, medically treated air as the same passes through the filter means 24 and enters the respiratory system of the user.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claim appended hereto.

I claim:

A disposable nasal filter comprising filter means of flexible porous material, a body molded integral with said filter means about the periphery thereof, said body having a rim shaped substantially to the contour of the nasal passage and being constructed of a glycerine gelatin which is a flexible, pliable, non-toxic, inert material to conform to the contour of the nasal passage when inserted thereinto, said rim having two sides each molded integral with the other and having a smooth planar outer peripheral wall, said rim fully encompassing and being molded integral with the edge portion of said filter means with said filter means being positioned between said peripheral wall and said sides, whereby said sides and peripheral wall of said rim space said filter means inwardly of the edge and sides respectively of said rim to prevent touching engagement of said filter means with the nasal passage mucous membranes when the disposable nasal filter is inserted into a nasal passage, and an air passageway in said body interrupted by said filter, said filter means being a mesh having a plurality of closely spaced interwoven lines of flexible pliable material forming a plurality of filter openings.

References Cited in the file of this patent

UNITED STATES PATENTS

| | | |
|---|---|---|
| 682,123 | Wilson | Sept. 3, 1901 |
| 2,020,107 | Cruickshank | Nov. 5, 1935 |

FOREIGN PATENTS

| | | |
|---|---|---|
| 442,725 | Great Britain | Feb. 10, 1936 |
| 668,395 | Germany | Dec. 2, 1938 |